Patented Nov. 24, 1925.

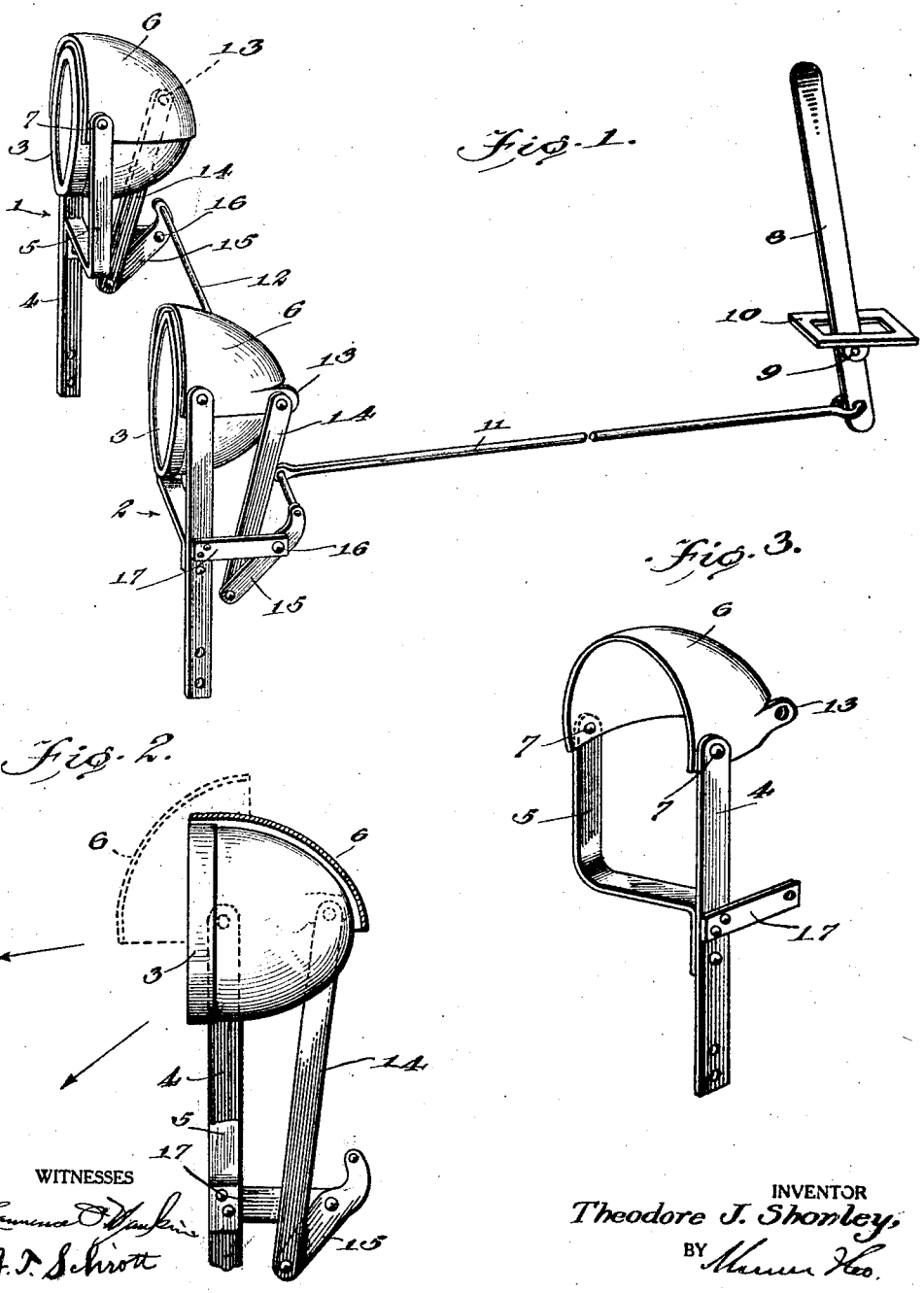

1,563,297

UNITED STATES PATENT OFFICE.

THEODORE J. SHONLEY, OF MOUNT AYR, IOWA.

MECHANICAL GLARE DARKENER FOR AUTOMOBILE HEADLIGHTS.

Application filed January 17, 1925. Serial No. 3,150.

*To all whom it may concern:*

Be it known that I, THEODORE J. SHONLEY, a citizen of the United States, and resident of Mount Ayr, in the county of Ringgold and State of Iowa, have invented certain new and useful Improvements in Mechanical-Glare Darkeners for Automobile Headlights, of which the following is a specification.

This invention relates to improvements in glare darkeners and it consists of the constructions, combinations and arrangements herein described and claimed.

An object of the invention is to provide means so mounted upon the headlights of a motor vehicle as to permit of sufficiently covering the fronts of the headlights upon occasion by manual operation to prevent the glare from interfering with approaching drivers.

Another object of the invention is to provide a shutter for each of the headlights of an automobile with common operating means for moving the shutters in front of the headlights to cut off the glare.

Other objects and advantages will be apparent from the following specification, reference being had to the accompanying drawing, in which Figure 1 is a perspective view of the glare darkener.

Figure 2 is a vertical section through one of the shutters, parts being shown in elevation.

Figure 3 is a detail perspective view of one of the shutters and its mounting.

In carrying out the invention provision is made of a pair of brackets 1 and 2, there being one of these for each of the headlights 3 of an automobile or other motor vehicle. Each of the brackets is composed of a straight bar 4, and a second bar 5 which is appropriately bent to fit around the headlights (Fig. 1).

The upper ends of each bracket pivotally carry a shutter 6 which, being of substantial hood-shape provides extremities at which pivotal mounting may be conveniently had. The pivots 7 are coaxial and may consist of rivets, bolts or equivalent means. The shutter 6, in each instance, is intended to rock forward upon the bracket by which it is carried and obscure the light of the headlight to the extent desired.

For this purpose provision is made of a manually operable lever 8. This lever is pivoted at 9 to an appropriate floor plate 10.

The lower end of the lever has connection with a rod 11 which extends forward and joins the cross rod 12 which is common to both headlight shutters. Each of the shutters is provided with an ear 13. The upper end of a link 14 is pivoted to the ear in each instance. The lower ends of the links are pivoted to cranks 15, the opposite ends of the cranks serving as places of connection of the common cross rod. The cranks are pivoted at 16 to extensions 17 of the brackets.

The operation is readily understood. Mention has been made of the lever 8 being manually operable. It is regarded as an obvious modification to so design the lever 8 that it may be operated by foot. In either case the action will be the same. Under normal conditions it is assumed that the shutters 6 are in the retracted position as shown in Figure 1, and in full lines in Figure 2.

Upon desiring to darken the glare of the headlight 3 the operator pulls back on the lever 8 whereupon the cranks 15 are rocked simultaneously, causing the shutters 6 to swing forwardly in front of the headlights. The amount of concealment of the headlights by the shutters depends on the extent of rearward movement of the lever 8. In practice it is preferable to move the lever 8 only so far as will bring the shutters to the dotted line position in Figure 2. The light will then be confined to the zone between the arrows, furnishing ample illumination of the road in front but protecting the eyes of approaching drivers from the light glare according to the purpose of the invention.

It is primarily intended that the glare darkener shall protect apporaching drivers. But an advantage incidentally derived from the use of the darkener is to protect the eyes of pedestrians as well. By appropriate use of the shutters the light is confined to the zone desired. This is accomplished partially by the shape of the shutters, which permits closure not only of the front of the headlights but also of the sides. In other words, light is not permitted to escape at the sides of the shutters.

While the construction and arrangement of the improved glare darkener is that of a generally preferred form, obviously modifications and changes may be made without departing from the spirit of the invention or the scope of the claims.

I claim:—

1. A glare darkener for headlights comprising a bracket having bar portions extending upwardly at the sides of a headlight, a shutter rockably mounted upon said bar portions and normally partially fitting around the headlight, an extension carried by the bracket, articulated means for moving the shutter including a crank pivoted upon the extension and a link reaching to the shutter, means including an ear on the shutter with which said link is connected and by which the shutter is rocked upon said bar portions, and actuating means for said articulated connection including a lever and a rod.

2. A glare darkener for headlights comprising a pair of supports having coaxial pivots, a hood like shutter rockably mounted on said pivots and by virtue of said hood-like shape serving to confine side rays of light, actuating means for the shutters including cranks pivoted upon the supports and connecting links, a cross rod providing a common connection for said cranks, and means including a rod in connection with said cross rods for actuating the articulated connections and moving the shutters simultaneously.

THEODORE J. SHONLEY.